(12) United States Patent  
Tanaka et al.

(10) Patent No.: US 11,332,630 B2
(45) Date of Patent: *May 17, 2022

(54) INK SET AND INK JET METHOD

(71) Applicant: Seiko Epson Corporation, Tokyo (JP)

(72) Inventors: Kyohei Tanaka, Matsumoto (JP); Midori Sekine, Matsumoto (JP); Keitaro Nakano, Matsumoto (JP); Yuko Hishida, Matsumoto (JP); Tsuyoshi Sano, Shiojiri (JP)

(73) Assignee: Seiko Epson Corporation ( * ) Notice: Subject to any disclaimer, the term of this patent is extended or adjusted under 35 U.S.C. 154(b) by 0 days.

This patent is subject to a terminal disclaimer.

(21) Appl. No.: 16/937,817

(22) Filed: Jul. 24, 2020

(65) Prior Publication Data
US 2021/0024761 A1 Jan. 28, 2021

(30) Foreign Application Priority Data

Jul. 26, 2019 (JP) .............................. JP2019-137839

(51) Int. Cl.
C09D 11/101 (2014.01)
B41J 11/00 (2006.01)
(Continued)

(52) U.S. Cl.
CPC ........... *C09D 11/101* (2013.01); *B41J 2/2107* (2013.01); *B41J 11/002* (2013.01);
(Continued)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; B41J 11/0021; B41J 2/2107; B41J 2/01; B41J 11/002; B41J 2/211;
(Continued)

(56) References Cited

U.S. PATENT DOCUMENTS 9,751,337 B2 9/2017 Steert
10,550,275 B2 2/2020 Hirose et al.
(Continued)

FOREIGN PATENT DOCUMENTS

EP 2636709 A1 9/2013
EP 2942204 A1 11/2015
(Continued)

*Primary Examiner* — Manish S Shah
(74) *Attorney, Agent, or Firm* — Harness, Dickey & Pierce, P.L.C.

(57) ABSTRACT

Provided is an ink set of radiation-curable ink jet compositions each including a polymerizable compound component. The ink set includes a color ink and a clear ink as the radiation-curable ink jet compositions. The polymerizable compound component contained in the clear ink includes a monomer A having a volume of 260 angstrom$^3$ or more and an area of 25 angstrom$^2$ or more in the height direction with respect to a long side defined by a van-der-Waals radius, and the content of the monomer A contained in the clear ink is 80 mass % or more based on the total amount of the polymerizable compound component.

11 Claims, 1 Drawing Sheet

(51) Int. Cl.
| | |
|---|---|
| *B41M 5/00* | (2006.01) |
| *C09D 11/037* | (2014.01) |
| *C09D 11/107* | (2014.01) |
| *C09D 11/322* | (2014.01) |
| *C09D 11/40* | (2014.01) |
| *C09D 11/54* | (2014.01) |
| *B41J 2/21* | (2006.01) |

(52) U.S. Cl.
CPC ......... *B41M 5/0023* (2013.01); *C09D 11/037* (2013.01); *C09D 11/107* (2013.01); *C09D 11/322* (2013.01); *C09D 11/40* (2013.01); *C09D 11/54* (2013.01)

(58) Field of Classification Search
CPC ........ B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0023; B41M 7/0081; B41M 3/006; B41M 3/003; G02B 5/20; G02B 5/223; C08K 3/11; C08K 2003/2237

See application file for complete search history.

(56) References Cited

U.S. PATENT DOCUMENTS

| | | | |
|---|---|---|---|
| 10,683,427 | B2 | 6/2020 | Umebayashi |
| 2004/0032473 | A1* | 2/2004 | Ishimoto ................ B41J 2/2114 347/100 |
| 2008/0125511 | A1* | 5/2008 | Nakano ................ C09D 11/101 522/181 |
| 2008/0146689 | A1* | 6/2008 | Oyanagi ................ C09D 11/40 522/39 |
| 2011/0234680 | A1* | 9/2011 | Aoyama ............. B41J 11/0015 347/20 |
| 2013/0065027 | A1 | 3/2013 | Mochizuki et al. |
| 2013/0230701 | A1 | 9/2013 | Mochizuki |
| 2015/0353751 | A1* | 12/2015 | Umebayashi ........ C09D 11/322 428/207 |
| 2017/0043593 | A1 | 2/2017 | Steert |
| 2017/0114234 | A1 | 4/2017 | Konda |
| 2017/0158890 | A1* | 6/2017 | Hirose ....................... B41J 2/01 |
| 2018/0282559 | A1* | 10/2018 | Umebayashi .......... B41J 2/2114 |

FOREIGN PATENT DOCUMENTS

| | | | | |
|---|---|---|---|---|
| EP | 3124561 | A1 | 2/2017 | |
| EP | 3170873 | A1 | 5/2017 | |
| EP | 3392051 | A1 | 10/2018 | |
| JP | 2013-067770 | A | 4/2013 | |
| WO | WO-2017104845 | A1 * | 6/2017 | ............ B41J 2/2114 |

* cited by examiner

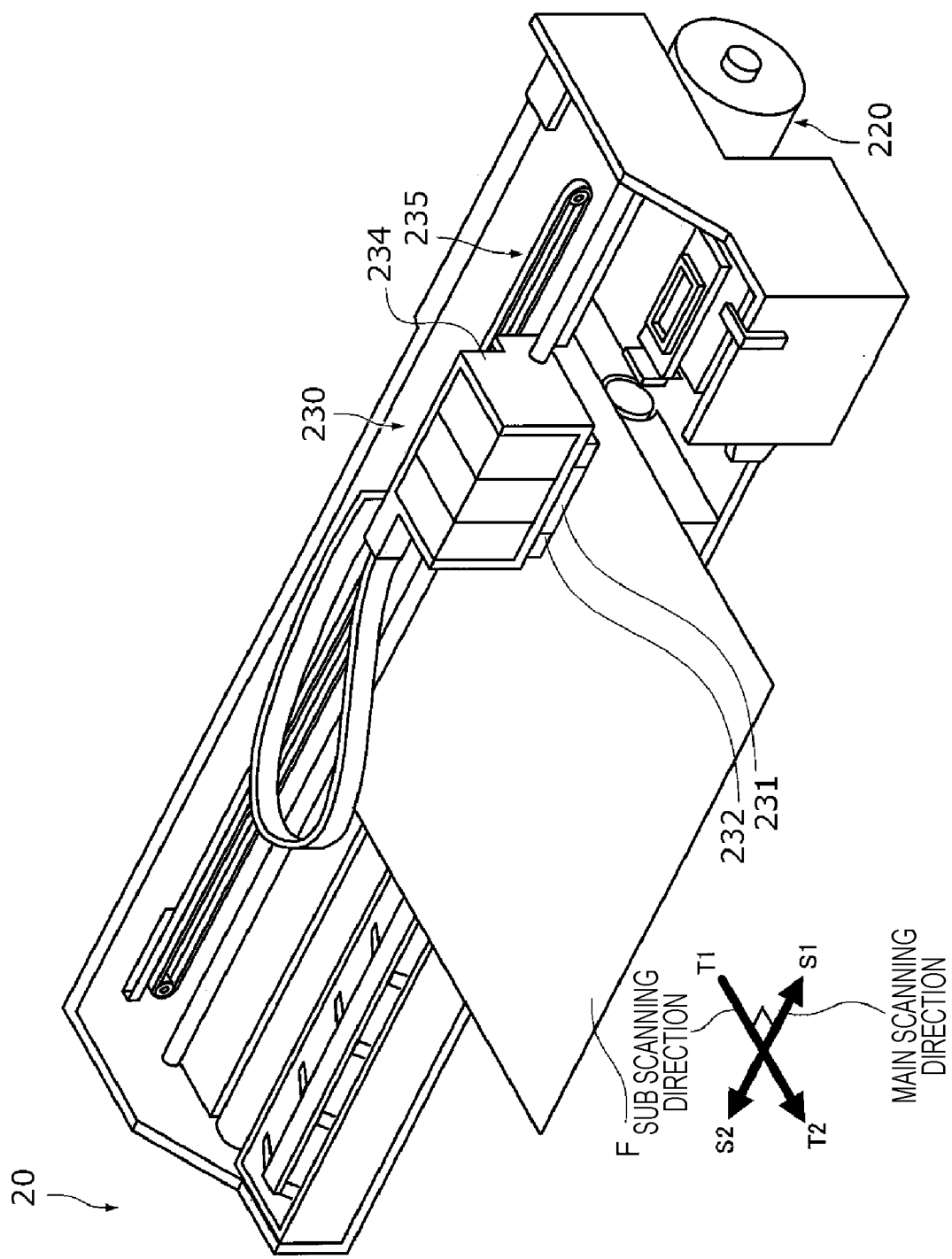

INK SET AND INK JET METHOD

The present application is based on, and claims priority from JP Application Serial Number 2019-137839, filed Jul. 26, 2019, the disclosure of which is hereby incorporated by reference herein in its entirety.

BACKGROUND

1. Technical Field

The present disclosure relates to an ink set and an ink jet method.

2. Related Art

For example, as described in JP-A-2013-67770, it has been known that an ink set for forming a multilayer, the ink set including coloring ink compositions each containing a radical polymerizable compound, such as an N-vinyl compound, and a radical polymerization initiator and a clear ink composition containing a radical polymerizable compound, an acylphosphine oxide radical polymerization initiator, and a surfactant at a predetermined ratio, can form an image that has excellent image quality and glossiness, a good surface state, excellent blocking resistance, and no background color.

However, it has been found that when a specific radiation-curable clear ink is used as in the known ink set, the glossy appearance is lost after the application of a clear ink in some cases.

SUMMARY

The ink set of the present disclosure is an ink set of radiation-curable ink jet compositions each including a polymerizable compound component, where the ink set includes a color ink and a clear ink as the radiation-curable ink jet compositions, the polymerizable compound component contained in the clear ink includes a monomer A having a volume of 260 angstrom$^3$ or more and an area of 25 angstrom$^2$ or more in the height direction with respect to the long side defined by the van-der-Waals radius, and the content of the monomer A contained in the clear ink is 80 mass % or more based on the total amount of the polymerizable compound component.

In the ink set, the polymerizable compound component contained in the clear ink includes a monofunctional monomer component, and the content of the monofunctional monomer component contained in the clear ink may be 85 mass % or more based on the total amount of the polymerizable compound component contained in the clear ink.

In the ink set, the polymerizable compound component contained in the clear ink includes a monofunctional monomer component, and when the monomer A included in the monofunctional monomer component is referred to as monomer A1, the content of the monomer A1 contained in the clear ink may be 85 mass % or more based on the total amount of the monofunctional monomer component.

In the ink set, the polymerizable compound component contained in the clear ink includes a multifunctional monomer component, and the content of the multifunctional monomer component contained in the clear ink may be 0.01 to 15 mass % based on the total amount of the polymerizable compound component contained in the clear ink.

In the ink set, when the mass ratios of the contents of the respective polymerizable compounds contained in the clear ink are weighted, the weighted average of the glass transition temperatures of homopolymers of the respective polymerizable compounds may be 48° C. or more.

In the ink set, the polymerizable compound component contained in the clear ink may include an alicyclic group-containing (meth)acrylate as a monofunctional monomer.

In the ink set, the polymerizable compound component contained in the color ink includes a monofunctional monomer component, and the content of the monofunctional monomer component contained in the color ink may be 85 mass % or more based on the total amount of the polymerizable compound component contained in the color ink.

In addition, the ink jet method according to the present embodiment is an ink jet method using the ink set and includes a first discharging step of discharging the color ink with a liquid jet head to adhere the ink to a recording medium, a first curing step of irradiating the color ink adhered to the recording medium with radioactive rays, a second discharging step of discharging the clear ink with a liquid jet head to adhere the ink to at least a part of the color ink-adhered region of the recording medium, and a second curing step of irradiating the clear ink adhere to the recording medium with radioactive rays.

In addition, the ink jet method according to the present embodiment may include a leveling step of leaving the recording medium to which the clear ink adhered to stand after the second discharging step and before the second curing step.

BRIEF DESCRIPTION OF THE DRAWING

FIG. 1 is a perspective view illustrating an ink jet apparatus of a serial system according to the present embodiment.

DESCRIPTION OF EXEMPLARY EMBODIMENTS

Embodiments of the present disclosure (hereinafter, referred to as "the present embodiment") will now be described in detail with reference to the drawing as necessary, but the present disclosure is not limited thereto and can be variously modified within a range not changing the gist of the present disclosure. Incidentally, in the drawing, the same elements are denoted by the same reference numerals, and redundant description is omitted. Furthermore, the positional relationship, such as up and down or right and left, is based on the positional relationship shown in the drawings unless otherwise specified. Furthermore, the dimensional ratios in the drawing are not limited to the illustrated ratios.

In the present specification, the term "(meth)acryloyl" means at least one of acryloyl and methacryloyl corresponding to the acryloyl, the term "(meth)acrylate" means at least one of acrylate and methacrylate corresponding to the acrylate, and the term "(meth)acryl" means at least one of acryl and methacryl corresponding to the acryl.

1. Ink Set

The ink set according to the present embodiment is an ink set of radiation-curable ink jet compositions each including a polymerizable compound component and includes a color ink and a clear ink as the radiation-curable ink jet compositions.

Incidentally, the radiation-curable ink jet composition according to the present embodiment is a composition to be used by being discharged from an ink jet head by an ink jet method. Although a radiation-curable ink composition will now be described as an embodiment of the radiation-curable ink jet composition, the composition according to the present embodiment may be a composition other than ink compositions and may be, for example, a composition to be used for 3D molding.

In addition, the radiation-curable ink jet composition is cured by irradiation with radioactive rays. Examples of the radioactive rays include ultraviolet rays, electron rays, infrared rays, visible rays, and X-rays. The radioactive rays may be ultraviolet rays because the radiation source thereof is easily available and widely used and because a material suitable for being cured by irradiation with ultraviolet rays is easily available and widely used.

1.1. Clear Ink

The clear ink is a radiation-curable ink jet composition including a polymerizable compound component. Here, the "clear ink" is not an ink for coloring a recording medium but is an ink for, for example, adjusting the glossiness of a recording medium. Furthermore, the purposes of using the clear ink include improvement in characteristics, such as the scratch resistance of a recorded matter, and improvement in the fixity and the color development of a color ink. Specifically, the clear ink may be an ink composition containing a color material in an amount of 0.2 mass % or less or not containing any color material. In contrast, the color ink is an ink for coloring a recording medium and may contain a color material in an amount higher than 0.2 mass %.

The present inventors have investigated and have found that when a clear ink is used on a color ink layer for adjusting the glossiness of a recording medium, sufficiently glossy appearance is not obtained in some cases. This point has been further investigated, and it has been found that such a phenomenon is observed when a coating film is formed by a clear ink containing a relatively large amount of a low bulky monomer.

In contrast to the above, in the present embodiment, a reduction in glossy appearance can be suppressed by adding a predetermined amount of a bulky monomer A to the clear ink. More specifically, in the present embodiment, the bulkiness of a monomer is expressed by the volume and area defined by the van-der-Waals radius as indicators, and a clear ink containing a monomer A having a volume of 260 angstrom$^3$ or more and an area of 25 angstrom$^2$ or more in the height direction with respect to the long side defined by the van-der-Waals radius is used in an amount of 80 mass % or more based on the total amount of the polymerizable compound component.

The components that can be contained in the clear ink according to the present embodiment will now be described.

1.1.1. Polymerizable Compound Component

The polymerizable compound component includes a monofunctional monomer having one polymerizable functional group, a multifunctional monomer having multiple polymerizable functional groups, and an oligomer having one or multiple polymerizable functional groups. As the polymerizable compound component, a single component may be used, or a combination of two or more components may be used.

In the present embodiment, when the mass ratios of the contents of the respective polymerizable compounds contained in the clear ink are weighted, the weighted average of the glass transition temperatures of homopolymers of the respective polymerizable compounds is 48° C. or more and may be 70° C. or more or 90° C. or more. When the weighted average of the glass transition temperatures is 48° C. or more, the scratch resistance of the coating film at room temperature can be enhanced. In addition, the upper limit of the weighted average of glass transition temperatures is not particularly limited and may be 140° C. or less, 120° C. or less, or 110° C. or less.

A method for calculating the weighted average of glass transition temperatures will be described. The weighted average value of glass transition temperatures is represented by $Tg_{All}$, the glass transition temperature of the homopolymer of each polymerizable compound is represented by $Tg_N$, and the mass ratio of the content of the polymerizable compound is represented by $X_N$ (mass %), where N is a sequential number starting from 1 according to the types of the polymerizable compounds contained in the radiation-curable ink jet composition. For example, when three types of polymerizable compounds are used, $Tg_1$, $Tg_2$, and $Tg_3$ are generated. Incidentally, the glass transition temperature of a homopolymer of each polymerizable compound can be obtained from the safety data sheet (SDS) or catalog information of the polymerizable compound. The weighted average $Tg_{All}$ of glass transition temperatures is the sum total of the respective products of each glass transition temperature $Tg_N$ calculated for each polymerizable compound and the mass ratio $X_N$ of its content and is accordingly represented by the following expression (1): $Tg_{All} = \Sigma Tg_N \times X_N$.

Furthermore, the weighted average of glass transition temperatures can be adjusted by the glass transition temperatures of the polymerizable compounds to be used and the mass ratios of the contents of the polymerizable compounds to be used.

1.1.1.1. Monomer A

The monomer A of the present embodiment is a monomer having a volume of 260 angstrom$^3$ or more and an area of 25 angstrom$^2$ or more in the height direction with respect to the long side defined by the van-der-Waals radius. The monomer A can be classified into a monofunctional monomer A1 having one polymerizable functional group (hereinafter, also simply referred to as "monomer A1") and a multifunctional monomer A2 having multiple polymerizable functional groups (hereinafter, also simply referred to as "monomer A2"). As the monomer A, a single compound satisfying the above-mentioned requirements for bulkiness may be used, or a combination of two or more of such compounds may be used.

The volume of the monomer A defined by the van-der-Waals radius is 260 angstrom$^3$ or more and may be 270 angstrom$^3$ or more or 280 angstrom$^3$ or more. In addition, the volume defined by the van-der-Waals radius of the monomer A is not particularly limited and may be 600 angstrom$^3$ or less, 550 angstrom$^3$ or less, or 500 angstrom$^3$ or less. In addition, the area in the height direction with respect to the long side defined by the van-der-Waals radius of the monomer A is 25 angstrom$^2$ or more and may be 27 angstrom$^2$ or more or 29 angstrom$^2$ or more. In addition, the upper limit of the area in the height direction with respect to the long side defined by the van-der-Waals radius of the monomer A is not particularly limited and may be 50 angstrom$^2$ or less, 45 angstrom$^2$ or less, or 40 angstrom$^2$ or less. When the bulkiness of the monomer A is within the range defined above, a reduction in the gloss of coating film of the clear ink is suppressed.

Incidentally, the volume and the area in the height direction with respect to the long side defined by the van-der-Waals radius are determined as a volume and an area in the height direction with respect to the long side in the lowest energy molecular structure among the structural isomers of the molecule. In specifying of the three-dimensional shape defined by the van-der-Waals radius of a molecule and calculation of the volume and the area in the height direction with respect to the long side based on the shape, it is possible to use known software, such as thermodynamic property prediction software.

The "volume" is the volume of a cavity estimated from the van-der-Waals radius through approximation of a molecular state in a vacuum from the chemical formula. The "long side" is the longest side of a three-dimensional shape defined by the van-der-Waals radius and is determined by calculating the distance between farthest ones of the terminal backbone atoms (C, O, N, etc.) when a structure that makes the molecule most stable is simulated. The "area in the height direction with respect to the long side" is the value obtained by dividing the volume by the long side and refers to an indicator of the area of a surface perpendicular to the long side.

The monomer A described above is not particularly limited, and examples thereof include the monofunctional monomer A1 having one polymerizable functional group, such as dicyclopentenyl acrylate (DCPA), isobornyl acrylate (IBXA), 3,3,5-trimethylcyclohexyl acrylate (TMCHA), tert-butylcyclohexanol acrylate (TBCHA), isononyl acrylate (INAA), and lauryl acrylate (LA); and the multifunctional monomer A2 having multiple polymerizable functional groups, such as dipropylene glycol diacrylate (DPGDA).

The content of the monomer A is 80 mass % or more based on the total amount of the polymerizable compound component and may be 82 mass % or more or 84 mass % or more. When the content of the monomer A is 80 mass % or more, a reduction in the gloss of coating film of the clear ink is suppressed. In addition, the upper limit of the content of the monomer A is not particularly limited and may be 99 mass % or less, 97 mass % or less, or 95 mass % or less based on the total amount of the polymerizable compound component. When the content of the monomer A is 99 mass % or less, the curability and the scratch resistance tend to be further improved.

Furthermore, regarding the monomer A, the content of the monomer A1, which is a monofunctional monomer having one polymerizable functional group, may be 80 mass % or more, 82 mass % or more, or 85 mass % or more based on the total amount of the monofunctional monomers. When the content of the monomer A1 is 80 mass % or more, a reduction in the gloss of coating film of the clear ink tends to be further suppressed. In addition, when the content of the monomer A1 is within the above-mentioned range, the wetting and spreading ability of the clear ink on a color ink layer is further improved, and further an image having high glossy appearance can be obtained. In addition, the content of the monomer A1 may be 95 mass % or less, 92 mass % or less, or 90 mass % or less based on the total amount of the monofunctional monomers. When the content of the monomer A1 is 95 mass % or less, the curability and scratch resistance of the resulting coating film tend to be further improved.

Furthermore, regarding the monomer A, the content of the monomer A2, which is a multifunctional monomer having multiple polymerizable functional groups, may be 1 mass % or more, 2 mass % or more, or 3 mass % or more based on the total amount of the polymerizable compound component. When the content of the monomer A2 is 1 mass % or more, the scratch resistance of the resulting coating film tends to be further improved.

1.1.1.2. Monofunctional Monomer Component

In the present embodiment, the monofunctional monomer component is a concept including the above-described monomer A1 and other monofunctional monomers. The monofunctional monomer is not particularly limited, and examples thereof include a nitrogen-containing monofunctional monomer, a monofunctional (meth)acrylate having a crosslinked condensed ring structure, an aromatic group-containing monofunctional monomer, and a saturated aliphatic group-containing monofunctional monomer. In addition, the monofunctional monomer component may include another monofunctional monomer as necessary in addition to or instead of the above-mentioned monomers. The optional monofunctional monomer is not particularly limited, and it is possible to use a known monofunctional monomer having a polymerizable functional group, in particular, a polymerizable functional group having an unsaturated carbon double bond.

Furthermore, in the present embodiment, for example, the term "saturated aliphatic group-containing monofunctional monomer" includes a saturated aliphatic group-containing monofunctional monomer as the monomer A1 and a saturated aliphatic group-containing monofunctional monomer other than the monomer A1. The same applies to other monofunctional monomers, such as a nitrogen-containing monofunctional monomer, a monofunctional (meth)acrylate having a crosslinked condensed ring structure, and an aromatic group-containing monofunctional monomer.

The content of the monofunctional monomer component contained in the clear ink may be 80 mass % or more, 85 mass % or more, 90 mass % or more, or 95 mass % or more based on the total amount of the polymerizable compound component. When the content of the monofunctional monomer component is 80 mass % or more based on the total amount of the polymerizable compound component, the flexibility of the coating film is further improved. In addition, the upper limit of the content of the monofunctional monomer component is not particularly limited and may be 99 mass % or less, 98 mass % or less, or 97 mass % or less based on the total amount of the polymerizable compound component. When the content of the monofunctional monomer component is 99 mass % or less based on the total amount of the polymerizable compound component, the curability and scratch resistance of the coating film tend to be further improved.

In addition, the content of the monofunctional monomer component contained in the clear ink may be 70 mass % or more, 75 mass % or more, or 80 mass % or more based on the total amount of the clear ink. When the content of the monofunctional monomer component is 70 mass % or more based on the total amount of the clear ink, the flexibility of the coating film tends to be further improved. In addition, the upper limit of the content of the monofunctional monomer component may be 95 mass % or less, 92 mass % or less, or 90 mass % or less based on the total amount of the clear ink. When the content of the monofunctional monomer component is 95 mass % or less based on the total amount of the clear ink, the curability and scratch resistance of the coating film tend to be further improved.

Examples of the monofunctional monomer are shown below, but the monofunctional monomers in the present embodiment are not limited to the following examples.

1.1.1.2.1. Nitrogen-Containing Monofunctional Monomer

The nitrogen-containing monofunctional monomer is not particularly limited, and examples thereof include nitrogen-containing monofunctional vinyl monomers, such as N-vinylcaprolactam, N-vinylformamide, N-vinylcarbazole, N-vinylacetamide, and N-vinylpyrrolidone; nitrogen-containing monofunctional acrylate monomers, such as acryloylmorpholine; and nitrogen-containing monofunctional acrylamide monomers, such as (meth)acrylamide, N-hydroxymethyl(meth)acrylamide, diacetone acrylamide, N,N- dimethyl(meth)acrylamide, and (meth)acrylamides such as a dimethylaminoethylacrylate benzyl chloride quaternary salt.

In particular, the nitrogen-containing monofunctional monomer contained in the clear ink may be either a nitrogen-containing monofunctional vinyl monomer or a nitrogen-containing monofunctional acrylate monomer, or may be a monomer having a nitrogen-containing heterocyclic structure, such as N-vinylcaprolactam, N-vinylcarbazole, N-vinylpyrrolidone, or acryloylmorpholine, or may be acryloylmorpholine.

The scratch resistance of the coating film tends to be further improved by using such a nitrogen-containing monofunctional monomer. Furthermore, a nitrogen-containing monofunctional acrylate monomer having a nitrogen-containing heterocyclic structure, such as acryloylmorpholine, tends to further improve the flexibility and adhesion of the coating film.

The content of the nitrogen-containing monofunctional monomer contained in the clear ink may be 2 to 15 mass %, 3 to 13 mass %, or 4 to 12 mass % based on the total amount of the polymerizable compound component. When the content of the nitrogen-containing monofunctional monomer based on the total amount of the polymerizable compound component is within the above-mentioned range, the scratch resistance and adhesion of the coating film tend to be further improved.

The content of the nitrogen-containing monofunctional monomer contained in the clear ink may be 2 to 15 mass %, 3 to 12 mass %, or 4 to 11 mass % based on the total amount of the clear ink. When the content of the nitrogen-containing monofunctional monomer based on the total amount of the clear ink is within the above-mentioned range, the scratch resistance and adhesion of the coating film tend to be further improved.

1.1.1.2.2. Monofunctional (Meth)Acrylate Having Crosslinked Condensed Ring Structure An example of the optional monofunctional monomer is a monofunctional (meth)acrylate having a crosslinked condensed ring structure. In the present disclosure, the term "crosslinked condensed ring structure" means a structure in which two or more ring structures share a side in a one-to-one manner to connect two or more non-adjacent atoms in a single ring structure or different ring structures. Examples of the monofunctional (meth)acrylate having a crosslinked condensed ring structure include dicyclopentenyl (meth)acrylate, dicyclopentenyloxyethyl (meth)acrylate, and dicyclopentanyl (meth)acrylate. Examples of the crosslinked condensed ring structure include, in addition to the above examples, the following compounds.

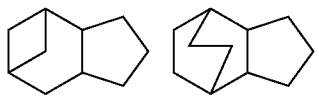

In particular, the monofunctional (meth)acrylate having a crosslinked condensed ring structure contained in the clear ink may be dicyclopentenyl (meth)acrylate, which corresponds to the monomer A. When such a monofunctional (meth)acrylate having a crosslinked condensed ring structure is used, not only the scratch resistance of the coating film and the flexibility and adhesion of the coating film tend to be further improved, but also a reduction in the gloss of coating film of the clear ink tends to be further suppressed.

The content of the monofunctional (meth)acrylate having a crosslinked condensed ring structure contained in the clear ink may be 10 to 65 mass %, 15 to 63 mass %, or 20 to 60 mass % based on the total amount of the polymerizable compound component. When the content of the monofunctional (meth)acrylate having a crosslinked condensed ring structure based on the total amount of the polymerizable compound component is within the above-mentioned range, the adhesion and scratch resistance of the coating film tend to be further improved.

The content of the monofunctional (meth)acrylate having a crosslinked condensed ring structure contained in the clear ink may be 10 to 60 mass %, 15 to 57 mass %, or 20 to 55 mass % based on the total amount of the clear ink. When the content of the monofunctional (meth)acrylate having a crosslinked condensed ring structure based on the total amount of the clear ink is within the above-mentioned range, the adhesion and scratch resistance of the coating film tend to be further improved.

1.1.1.2.3. Aromatic Group-Containing Monofunctional Monomer

The aromatic group-containing monofunctional monomer is not particularly limited, and examples thereof include phenoxyethyl (meth)acrylate, benzyl (meth)acrylate, alkoxylated 2-phenoxyethyl (meth)acrylate, ethoxylated nonylphenyl (meth)acrylate, alkoxylated nonylphenyl (meth)acrylate, p-cumylphenol EO-modified (meth)acrylate, and 2-hydroxy-3-phenoxypropyl (meth)acrylate.

Among these monomers, the aromatic group-containing monofunctional monomer may be phenoxyethyl (meth)acrylate or benzyl (meth)acrylate, in particular, phenoxyethyl (meth)acrylate, especially phenoxyethyl acrylate (PEA). When such an aromatic group-containing monofunctional monomer is used, the solubility of a photopolymerization initiator is further improved, and the curability of the clear ink tends to be further improved. In particular, when an acylphosphine oxide-based photopolymerization initiator or a thioxanthone-based photopolymerization initiator is used, the solubility thereof tends to be improved.

The content of the aromatic group-containing monofunctional monomer contained in the clear ink may be 2 to 15 mass %, 3 to 13 mass %, or 4 to 12 mass % based on the total amount of the polymerizable compound component. When the content of the aromatic group-containing monofunctional monomer based on the total amount of the polymerizable compound component is within the above-mentioned range, the adhesion and scratch resistance of the coating film tend to be further improved.

The content of the aromatic group-containing monofunctional monomer contained in the clear ink may be 2 to 15 mass %, 3 to 12 mass %, or 4 to 11 mass % based on the total amount of the clear ink. When the content of the aromatic group-containing monofunctional monomer based on the total amount of the clear ink is within the above-mentioned range, the adhesion and scratch resistance of the coating film tend to be further improved.

1.1.1.2.4. Saturated Aliphatic Group-Containing Monofunctional Monomer

The saturated aliphatic group-containing monofunctional monomer is not particularly limited, and examples thereof include alicyclic group-containing (meth)acrylates, such as isobornyl (meth)acrylate (IBXA), tert-butylcyclohexanol acrylate (TBCHA), and 2-(meth)acrylic acid-1,4-dioxaspiro[4,5]dec-2-ylmethyl; linear or branched aliphatic group-containing (meth)acrylates, such as isoamyl (meth)acrylate, stearyl (meth)acrylate, lauryl (meth)acrylate, octyl (meth)acrylate, decyl (meth)acrylate, isodecyl (meth)acrylate, isomyristyl (meth)acrylate, isostearyl (meth)acrylate, 2-hydroxybutyl (meth)acrylate, butoxyethyl (meth)acrylate, tetrahydrofurfuryl (meth)acrylate, 2-hydroxyethyl (meth) acrylate, and 2-hydroxypropyl (meth)acrylate; and lactone-modified flexible (meth)acrylate. Furthermore, in the present embodiment, the saturated aliphatic group-containing monofunctional monomer is not a compound having a crosslinked condensed ring structure.

Among these monomers, the saturated aliphatic group-containing monofunctional monomer may be isobornyl (meth)acrylate (IBXA) or tert-butylcyclohexanol acrylate (TBCHA), which correspond to the monomer A. When such a saturated aliphatic group-containing monofunctional monomer is used, not only the curability of the clear ink and the scratch resistance tend to be further improved, but also a reduction in the gloss of coating film of the clear ink tends to be further suppressed.

The content of the saturated aliphatic group-containing monofunctional monomer contained in the clear ink may be 15 to 85 mass %, 20 to 80 mass %, or 25 to 75 mass % based on the total amount of the polymerizable compound component. When the content of the saturated aliphatic group-containing monofunctional monomer based on the total amount of the polymerizable compound component is within the above-mentioned range, the curability of the clear ink and the scratch resistance tend to be further improved.

The content of the saturated aliphatic group-containing monofunctional monomer contained in the clear ink may be 15 to 80 mass %, 17 to 75 mass %, or 20 to 70 mass % based on the total amount of the clear ink. When the content of the saturated aliphatic group-containing monofunctional monomer based on the total amount of the clear ink is within the above-mentioned range, the curability of the clear ink and the scratch resistance tend to be further improved.

1.1.1.2.5. Others

In addition to the above, other examples of the optional monofunctional monomer include unsaturated carboxylic acids, such as (meth)acrylic acid, itaconic acid, crotonic acid, isocrotonic acid, and maleic acid; salts of the unsaturated carboxylic acids; unsaturated carboxylic acid esters, urethanes, amides, and anhydrides; acrylonitrile, styrene, various unsaturated polyesters, unsaturated polyethers, unsaturated polyamides, and unsaturated urethanes.

1.1.1.3. Multifunctional Monomer Component

Examples of the multifunctional monomer of the present embodiment include, but not limited to, vinyl ether group-containing (meth)acrylates and multifunctional (meth)acrylates.

The content of the multifunctional monomer component contained in the clear ink may be 0.01 to 20 mass %, 0.01 to 15 mass %, or 1 to 15 mass % based on the total amount of the polymerizable compound component. When the content of the multifunctional monomer component is 0.01 mass % or more based on the total amount of the polymerizable compound component, excellent curability is obtained, and the scratch resistance tends to be further improved. In addition, when the content of the multifunctional monomer component is 20 mass % or less based on the total amount of the polymerizable compound component, the flexibility and adhesion of the coating film tend to be further improved.

In addition, the content of the multifunctional monomer component contained in the clear ink may be 0.01 to 20 mass %, 0.01 to 18 mass %, or 1 to 15 mass % based on the total amount of the clear ink. When the content of the multifunctional monomer component is 0.01 mass % or more based on the total amount of the clear ink, excellent curability is obtained, and the scratch resistance tends to be further improved. When the content of the multifunctional monomer component is 20 mass % or less based on the total amount of the clear ink, the flexibility and adhesion of the coating film tend to be further improved.

Examples of the multifunctional monomer are shown below, but the multifunctional monomer in the present embodiment is not limited to the following examples.

1.1.1.3.1. Vinyl Ether Group-Containing (Meth)Acrylate

The vinyl ether group-containing (meth)acrylate is not particularly limited, and examples thereof include compounds represented by the following formula (1). When such a vinyl ether group-containing (meth)acrylate is used, the viscosity of the clear ink decreases, and the discharge stability tends to be further improved. In addition, the curability of the clear ink is further improved, and the recording speed can be further increased with the improvement in the curability.

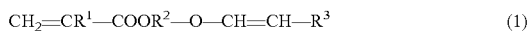

$$CH_2=CR^1-COOR^2-O-CH=CH-R^3 \qquad (1)$$

(where, $R^1$ is a hydrogen atom or a methyl group, $R^2$ is a divalent C2-C20 organic residue, and $R^3$ is a hydrogen atom or a monovalent C1-C11 organic residue).

In the formula (1), examples of the divalent C2-C20 organic residue represented by $R^2$ include an optionally substituted linear, branched, or cyclic C2-C20 alkylene group, an optionally substituted C2-C20 alkylene group having an oxygen atom forming an ether bond and/or an ester bond in the structure, and an optionally substituted divalent C6-C11 aromatic group. In particular, the organic residue may be a C2-C6 alkylene group, such as an ethylene group, an n-propylene group, an isopropylene group, and a butylene group; or a C2-C9 alkylene group having an oxygen atom forming an ether bond in the structure, such as an oxyethylene group, an oxy-n-propylene group, an oxyisopropylene group, and an oxybutylene group. Furthermore, from the viewpoint of further reducing the viscosity of the clear ink and further improving the curability of the clear ink, the vinyl ether group-containing (meth)acrylate may be a compound having a glycol ether chain, in which $R^2$ is a C2-C9 alkylene group having an oxygen atom forming an ether bond in the structure, such as an oxyethylene group, an oxy-n-propylene group, an oxyisopropylene group, and an oxybutylene group.

In the formula (1), the monovalent C1-C11 organic residue represented by $R^3$ may be an optionally substituted linear, branched, or cyclic C1-C10 alkyl group or an optionally substituted C6-C11 aromatic group. In particular, the monovalent C1-C11 organic residue may be a C1-C2 alkyl group, i.e., a methyl group or an ethyl group, or a C6-C8 aromatic group, such as a phenyl group or a benzyl group.

When each of the above-described organic residues is an optionally substituted group, the substituents are divided into groups containing carbon atoms and groups not containing carbon atoms. When the substituent is a group containing a carbon atom, the carbon atom is counted as the carbon atom of the organic residue. Examples of the group containing a carbon atom include, but not limited to, a carboxyl group and an alkoxy group. When the substituent is a group not containing a carbon atom, examples thereof include, but not limited to, a hydroxy group and a halo group.

Examples of the compound represented by the formula (1) include, but not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate1, 1,1-dimethyl-2- vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth) acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl (meth)acrylate, 2-(vinyloxyisopropoxy) ethyl (meth)acrylate, 2-(vinyloxyethoxy) propyl (meth acrylate, 2-(vinyloxyethoxy) isopropyl (meth)acrylate, 2-(vinyloxyisopropoxy) propyl (meth)acrylate, 2-(vinyloxyisopropoxy) isopropyl (meth)acrylate, 2-(vinyloxyethoxyethoxy) ethyl (meth)acrylate, 2-(vinyloxyethoxyisopropoxy) ethyl (meth) acrylate, 2-(vinyloxyisopropoxyethoxy) ethyl (meth)acrylate, 2-(vinyloxyisopropoxyisopropoxy)ethyl (meth)acrylate, 2-(vinyloxyethoxyethoxy) propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth) acrylate, polyethylene glycol monovinyl ether (meth)acrylate, and polypropylene glycol monovinyl ether (meth) acrylate. Among these examples, in particular, the compound may be 2-(2-vinyloxyethoxy) ethyl acrylate from the viewpoint of easiness of keeping the balance between the curability and the viscosity of the clear ink. Incidentally, in the present embodiment, 2-(2-vinyloxyethoxy)ethyl acrylate may also be referred to as VEEA.

The content of the vinyl ether group-containing (meth) acrylate contained in the clear ink may be 1 to 10 mass %, 2 to 8 mass %, or 2 to 6 mass % based on the total amount of the polymerizable compound component. When the content of the vinyl ether group-containing (meth)acrylate based on the total amount of the polymerizable compound component is within the above-mentioned range, the viscosity of the clear ink decreases, and the discharge stability tends to be further improved.

The content of the vinyl ether group-containing (meth) acrylate contained in the clear ink may be 1 to 10 mass %, 1 to 8 mass %, or 2 to 6 mass % based on the total amount of the clear ink. When the content of the vinyl ether group-containing (meth)acrylate based on the total amount of the clear ink is within the above-mentioned range, the viscosity of the clear ink decreases, and the discharge stability tends to be further improved.

1.1.1.3.2. Multifunctional (Meth)Acrylate

The multifunctional (meth)acrylate is not particularly limited, and examples thereof include difunctional (meth) acrylates, such as dipropylene glycol diacrylate (DPGDA), diethylene glycol di(meth)acrylate, triethylene glycol di(meth)acrylate, tetraethylene glycol di(meth)acrylate, polyethylene glycol di(meth)acrylate, dipropylene glycol di(meth) acrylate, tripropylene glycol di(meth)acrylate, polypropylene glycol di(meth)acrylate, 1,4-butanediol di(meth)acrylate, 1,6-hexanediol di(meth)acrylate (HDDA), 1,9-nonanediol di(meth)acrylate, neopentyl glycol di(meth) acrylate, dimethylol-tricyclodecane di(meth)acrylate, bisphenol A EO (ethylene oxide) adduct di(meth)acrylate, bisphenol A PO (propylene oxide) adduct di(meth)acrylate, hydroxypivalic acid neopentyl glycol di(meth)acrylate, and polytetramethylene glycol di(meth)acrylate; and tri- or higher multifunctional (meth)acrylates, such as trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

The content of the multifunctional (meth)acrylate contained in the clear ink may be 1 to 20 mass %, 1 to 17 mass %, or 2 to 15 mass % based on the total amount of the polymerizable compound component. When the content of the multifunctional (meth)acrylate is 1 mass % or more based on the total amount of the polymerizable compound component, the scratch resistance tends to be further improved. In addition, when the content of the multifunctional (meth)acrylate is 20 mass % or less based on the total amount of the polymerizable compound component, the flexibility and adhesion of the coating film tend to be further improved.

In addition, the content of the multifunctional (meth) acrylate contained in the clear ink may be 1 to 20 mass %, 1 to 17 mass %, or 2 to 15 mass % based on the total amount of the clear ink. When the content of the multifunctional (meth)acrylate is 1 mass % or more based on the total amount of the clear ink, the scratch resistance tends to be further improved. In addition, when the content of the multifunctional (meth)acrylate is 20 mass % or less based on the total amount of the clear ink, the flexibility and adhesion of the coating film tend to be further improved.

1.1.2. Photopolymerization Initiator

The photopolymerization initiator may be any initiator that generates an active species by irradiation with radioactive rays, and examples thereof include known photopolymerization initiators, such as acylphosphine oxide-based photopolymerization initiators, alkylphenone-based polymerization initiators, titanocene-based polymerization initiators, and thioxanthone-based photopolymerization initiators. In particular, the initiator may be an acylphosphine oxide-based photopolymerization initiator. The use of such a photopolymerization initiator further improves the curability of the clear ink and tends to further improve the curability, in particular, in the curing process by light from a UV-LED. The photopolymerization initiators may be used alone or in combination of two or more thereof.

The acylphosphine oxide-based photopolymerization initiator is not particularly limited, and examples thereof include 2,4,6-trimethylbenzoyl diphenylphosphine oxide, bis(2,4,6-trimethylbenzoyl)-phenylphosphine oxide, and bis (2,6-dimethoxybenzoyl)-2,4,4-trimethylpentylphosphine oxide.

Examples of commercial products of the acylphosphine oxide-based photopolymerization initiator include IRGACURE 819 (bis(2,4,6-trimethylbenzoyl)-phenylphosphine oxide), IRGACURE 1800 (a mixture of bis(2,6-dimethoxybenzoyl)-2,4,4-trimethylpentylphosphine oxide and 1-hydroxy-cyclohexyl-phenylketone in a mass ratio of 25:75), and IRGACURE TPO (2,4,6-trimethylbenzoyl diphenylphosphine oxide) (these products are all manufactured by BASF SE).

The content of the photopolymerization initiator contained in the clear ink may be 3 to 12 mass %, 5 to 10 mass %, or 7 to 9 mass % based on the total amount of the clear ink. When the content of the photopolymerization initiator is within the above-mentioned range, the curability of the clear ink and the solubility of the photopolymerization initiator tend to be further improved.

1.1.4. Other Additives

The clear ink according to the present embodiment may further contain additives, such as a polymerization inhibitor and a slipping agent, as necessary.

1.1.4.2. Polymerization Inhibitor

The clear ink according to the present embodiment may further contain a polymerization inhibitor. As the polymerization inhibitor, a single polymerization inhibitor may be used, or a combination of two or more polymerization inhibitors may be used.

Examples of the polymerization inhibitor include, but not limited to, p-methoxyphenol, hydroquinone monomethyl ether (MEHQ), 4-hydroxy-2,2,6,6-tetramethylpiperidine-N-oxyl, hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), 4,4'-thiobis(3-methyl-6-t-butylphenol), and hindered amine compounds.

The content of the polymerization inhibitor may be 0.05 to 1 mass % or 0.05 to 0.5 mass % based on the total amount of the clear ink.

1.1.4.3. Slipping Agent

The clear ink according to the present embodiment may further contain a slipping agent. As the slipping agent, a single slipping agent may be used, or a combination of two or more slipping agents may be used.

The slipping agent may be a silicone surfactant, in particular, polyester-modified silicone or polyether-modified silicone. Examples of the polyester-modified silicone include BYK-347 and 348 and BYK-UV 3500, 3510, and 3530 (these products are all manufactured by BYK Additives & Instruments). Examples of the polyether-modified silicone include BYK-3570 (manufactured by BYK Additives & Instruments).

The content of the slipping agent may be 0.01 to 2 mass % or 0.05 to 1 mass % based on the total amount of the clear ink.

1.2. Color Ink

The color ink is a radiation-curable ink jet composition including a polymerizable compound component. Here, the "color ink" is an ink for coloring a recording medium. The components that can be contained in the color ink according to the present embodiment will now be described.

1.2.1. Polymerizable Compound Component

The polymerizable compound includes a monofunctional monomer having one polymerizable functional group, a multifunctional monomer having multiple polymerizable functional groups, and an oligomer having one or multiple polymerizable functional groups. As the polymerizable compound component, a single component may be used, or a combination of two or more components may be used.

In the present embodiment, when the mass ratios of the contents of the respective polymerizable compounds contained in the color ink are weighted, the weighted average of the glass transition temperatures of homopolymers of the respective polymerizable compounds is 50° C. or more and may be 65° C. or more or 80° C. or more. When the weighted average of glass transition temperatures is 50° C. or more, the scratch resistance of the coating film at room temperature can be enhanced. In addition, the upper limit of the weighted average of glass transition temperatures is not particularly limited and may be 140° C. or less, 120° C. or less, or 110° C. or less.

The weighted average of glass transition temperatures is calculated by the same method as in the clear ink. Incidentally, the weighted average of glass transition temperatures can be adjusted by the glass transition temperatures of the polymerizable compounds to be used and the mass ratios of the contents of the polymerizable compounds to be used.

1.2.1.1. Monofunctional Monomer Component

In the present embodiment, the monofunctional monomer component is not particularly limited, and examples thereof include a nitrogen-containing monofunctional monomer, a monofunctional (meth)acrylate having a crosslinked condensed ring structure, an aromatic group-containing monofunctional monomer, and a saturated aliphatic group-containing monofunctional monomer. In addition, the monofunctional monomer component may include another monofunctional monomer as necessary in addition to or instead of the above-mentioned monomers. The optional monofunctional monomer is not particularly limited, and it is possible to use a known monofunctional monomer having a polymerizable functional group, in particular, a polymerizable functional group having an unsaturated carbon double bond.

The content of the monofunctional monomer component contained in the color ink is 80 mass % or more based on the total amount of the polymerizable compound component and may be 85 mass % or more or 90 mass % or more. When the content of the monofunctional monomer component is 80 mass % or more based on the total amount of the polymerizable compound component, the flexibility of the coating film is further improved. In addition, when the content of monofunctional monomers contained in a color ink is within the above-mentioned range, since the deterioration of gloss tends to occur, the present disclosure is especially useful. In addition, the upper limit of the content of the monofunctional monomer component is not particularly limited and may be 99 mass % or less, 98 mass % or less, or 97 mass % or less based on the total amount of the polymerizable compound component. When the content of the monofunctional monomer component is 99 mass % or less based on the total amount of the polymerizable compound component, the scratch resistance of the coating film tends to be further improved.

In addition, the content of the monofunctional monomer component contained in the color ink may be 65 mass % or more, 70 mass % or more, or 75 mass % or more based on the total amount of the color ink. When the content of the monofunctional monomer component is 75 mass % or more based on the total amount of the color ink, the flexibility of the coating film tends to be further improved. In addition, the upper limit of the content of the monofunctional monomer component may be 97 mass % or less, 95 mass % or less, or 90 mass % or less based on the total amount of the color ink. When the content of the monofunctional monomer component is 97 mass % or less based on the total amount of the clear ink, the curability of the coating film tends to be further improved.

As the nitrogen-containing monofunctional monomer, the monofunctional (meth)acrylate having a crosslinked condensed ring structure, the aromatic group-containing monofunctional monomer, the saturated aliphatic group-containing monofunctional monomer, and other monofunctional monomers that are contained in the color ink, those exemplified for the clear ink can be exemplified.

The content of the nitrogen-containing monofunctional monomer contained in the color ink may be 3 to 17 mass %, 5 to 15 mass %, or 8 to 12 mass % based on the total amount of the polymerizable compound component. When the content of the nitrogen-containing monofunctional monomer based on the total amount of the polymerizable compound component is within the above-mentioned range, the scratch resistance and adhesion of the coating film tend to be further improved.

The content of the nitrogen-containing monofunctional monomer contained in the color ink may be 3 to 17 mass %, 5 to 15 mass %, or 8 to 12 mass % based on the total amount of the color ink. When the content of the nitrogen-containing monofunctional monomer based on the total amount of the color ink is within the above-mentioned range, the scratch resistance and adhesion of the coating film tend to be further improved.

The content of the monofunctional (meth)acrylate having a crosslinked condensed ring structure contained in the color ink may be 20 to 55 mass %, 25 to 50 mass %, or 30 to 45 mass % based on the total amount of the polymerizable compound component. When the content of the monofunctional (meth)acrylate having a crosslinked condensed ring structure based on the total amount of the polymerizable compound component is within the above-mentioned range, the adhesion and scratch resistance of the coating film tend to be further improved.

The content of the monofunctional (meth)acrylate having a crosslinked condensed ring structure contained in the color ink may be 15 to 50 mass %, 20 to 45 mass %, or 25 to 40 mass % based on the total amount of the color ink. When the content of the monofunctional (meth)acrylate having a crosslinked condensed ring structure based on the total amount of the color ink is within the above-mentioned range, the adhesion and scratch resistance of the coating film tend to be further improved.

The content of the aromatic group-containing monofunctional monomer contained in the color ink may be 2 to 12 mass %, 3 to 10 mass %, or 4 to 7 mass % based on the total amount of the polymerizable compound component. When the content of the aromatic group-containing monofunctional monomer based on the total amount of the polymerizable compound component is within the above-mentioned range, the adhesion and scratch resistance of the coating film tend to be further improved.

The content of the aromatic group-containing monofunctional monomer contained in the color ink may be 2 to 12 mass %, 3 to 10 mass %, or 4 to 7 mass % based on the total amount of the color ink. When the content of the aromatic group-containing monofunctional monomer based on the total amount of the color ink is within the above-mentioned range, the adhesion and scratch resistance of the coating film tend to be further improved.

The content of the saturated aliphatic group-containing monofunctional monomer contained in the color ink may be 15 to 45 mass %, 20 to 40 mass %, or 25 to 35 mass % based on the total amount of the polymerizable compound component. When the content of the saturated aliphatic group-containing monofunctional monomer within the above-mentioned range, the curability of the color ink tends to be further improved.

The content of the saturated aliphatic group-containing monofunctional monomer contained in the color ink may be 15 to 40 mass %, 20 to 35 mass %, or 25 to 30 mass % based on the total amount of the color ink. When the content of the saturated aliphatic group-containing monofunctional monomer is within the above-mentioned range, the curability of the color ink tends to be further improved.

1.2.1.2. Multifunctional Monomer Component

Examples of the multifunctional monomer in the present embodiment include, but not limited to, vinyl ether group-containing (meth)acrylates and multifunctional (meth)acrylates. As the multifunctional monomer, those exemplified for the clear ink can be exemplified.

The content of the multifunctional monomer component contained in the color ink may be 0.01 to 20 mass %, 0.01 to 18 mass %, or 0.01 to 15 mass % based on the total amount of the polymerizable compound component. When the content of the multifunctional monomer component is 0.01 mass % or more based on the total amount of the polymerizable compound component, the scratch resistance tends to be further improved. In addition, when the content of the multifunctional monomer component is 20 mass % or less based on the total amount of the polymerizable compound component, the flexibility and adhesion of the coating film tend to be further improved.

In addition, the content of the multifunctional monomer component contained in the color ink may be 0.01 to 20 mass %, 0.01 to 18 mass %, or 0.01 to 15 mass % based on the total amount of the color ink. When the content of the multifunctional monomer component is 0.01 mass % or more based on the total amount of the color ink, the scratch resistance tends to be further improved. In addition, when the content of the multifunctional monomer component is 20 mass % or less based on the total amount of the color ink, the flexibility and adhesion of the coating film tend to be further improved.

The content of the vinyl ether group-containing (meth)acrylate contained in the color ink may be 1 to 10 mass %, 1 to 7 mass %, or 2 to 5 mass % based on the total amount of the polymerizable compound component. When the content of the vinyl ether group-containing (meth)acrylate based on the total amount of the polymerizable compound component is within the above-mentioned range, the viscosity of the color ink decreases, and the discharge stability tends to be further improved.

The content of the vinyl ether group-containing (meth)acrylate contained in the total amount of the color ink may be 1 to 10 mass %, 1 to 7 mass %, or 2 to 5 mass % based on the total amount of the color ink. When the content of the vinyl ether group-containing (meth)acrylate based on the total amount of the color ink is within the above-mentioned range, the viscosity of the color ink decreases, and the discharge stability tends to be further improved.

The content of the multifunctional (meth)acrylate contained in the color ink may be 1 to 20 mass %, 1 to 18 mass %, or 2 to 15 mass % based on the total amount of the polymerizable compound component. When the content of the multifunctional (meth)acrylate is 1 mass % or more based on the total amount of the polymerizable compound component, the scratch resistance tends to be further improved. In addition, when the content of the multifunctional (meth)acrylate is 20 mass % or less based on the total amount of the polymerizable compound component, the flexibility and adhesion of the coating film tend to be further improved.

The content of the multifunctional (meth)acrylate contained in the color ink may be 1 to 20 mass %, 1 to 18 mass %, or 2 to 15 mass % based on the total amount of the color ink. When the content of the multifunctional (meth)acrylate is 1 mass % or more based on the total amount of the color ink, the scratch resistance tends to be further improved. In addition, when the content of the multifunctional (meth)

acrylate is 20 mass % or less based on the total amount of the color ink, the flexibility and adhesion of the coating film tend to be further improved.

1.2.2. Photopolymerization Initiator

Examples of the photopolymerization initiator contained in the color ink include those exemplified for the clear ink. The content of the photopolymerization initiator may be 3 to 12 mass %, 5 to 10 mass %, or 7 to 9 mass % based on the total amount of the color ink. When the content of the photopolymerization initiator is within the above-mentioned range, the curability of the color ink and the solubility of the photopolymerization initiator tend to be further improved.

1.2.3. Color Material

As the color material contained in the color ink, at least one of a pigment and a dye can be used.

The total content of the color material may be 0.2 to 20 mass %, 0.5 to 15 mass %, or 1 to 10 mass % based on the total amount of the color ink.

1.2.3.1. Pigment

The light resistance of the color ink can be improved by using a pigment as the color material. The pigment may be an inorganic pigment or an organic pigment. As the pigment, a single pigment may be used, or a combination of two or more pigments may be used.

As the inorganic pigment, carbon blacks (C.I. (Colour Index Generic Name) Pigment Black 7), such as Furnace Black, Lamp Black, Acetylene Black, and Channel Black, iron oxide, and titanium oxide can be used.

Examples of the organic pigment include azo pigments, such as insoluble azo pigments, condensed azo pigments, azo lakes, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates (e.g., basic dye-type chelates and acidic dye-type chelates); dye lakes (basic dye-type lakes and acidic dye-type lakes); nitro pigments; nitroso pigments; aniline black; and daylight fluorescent pigments.

Further specifically, examples of the carbon black used in a black ink include No. 2300, No. 900, MCF88, No. 33, No. 40, No. 45, No. 52, MA7, MA8, MA100, and No. 2200B (these products are all manufactured by Mitsubishi Chemical Corporation); Raven 5750, Raven 5250, Raven 5000, Raven 3500, Raven 1255, and Raven 700 (these products are all manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (these products are all manufactured by Cabot JAPAN K.K.); and Color Black FW1, Color Black FW2, Color Black FW2V, Color Black FW18, Color Black FW200, Color Black S150, ColorBlack 5160, Color Black 5170, Printex 35, Printex U, Printex V, Printex 140U, SpecialBlack 6, Special Black 5, Special Black 4A, and Special Black 4 (these products are all manufactured by Degussa-Huls AG).

Examples of the pigment used in a white ink include C.I. Pigment White 6, 18, and 21.

Examples of the pigment used in a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of the pigment used in a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violet 19, 23, 32, 33, 36, 38, 43, and 50.

Examples of the pigment used in a cyan ink include C.I. Pigment Blue 1, 2, 3, 15, 15:1, 15:2, 15:3, 15:34, 15:4, 16, 18, 22, 25, 60, 65, and 66; and C.I. Vat Blue 4 and 60.

In addition, examples of pigments other than magenta, cyan, and yellow pigments include C.I. Pigment Green 7 and 10; C.I. Pigment Brown 3, 5, 25, and 26; and C.I. Pigment Orange 1, 2, 5, 7, 13, 14, 15, 16, 24, 34, 36, 38, 40, 43, and 63.

The content of the pigment contained in a color ink may be 1 to 20 mass %, 1 to 15 mass %, or 1 to 10 mass % based on the total amount of the color ink.

1.2.3.2. Dye

As the color material, a dye can be used. The dye is not particularly limited, and an acidic dye, a direct dye, a reactive dye, and a basic dye can be used. As the dye, a single dye may be used, or a combination of two or more dyes may be used.

The dye is not particularly limited, and examples thereof include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

1.2.4. Other Additives

The color ink may further contain additives, such as a dispersant, a polymerization inhibitor, and a slipping agent, as necessary.

1.2.4.1. Dispersant

The dispersant is not particularly limited, and examples thereof include dispersants that are commonly used for preparing pigment dispersions, such as polymer dispersants. Specifically, examples thereof include dispersants whose main component is at least one selected from polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. The dispersants may be used alone or in combination of two or more thereof.

Examples of commercial products of the polymer dispersant include AJISPER series manufactured by Ajinomoto Fine-Techno Co., Ltd., Solsperse series (such as Solsperse 36000) available from Avecia or Noveon, Inc., DISPERBYK series manufactured by BYK Additives & Instruments, and DISPARLON series manufactured by Kusumoto Chemicals, Ltd.

The content of the dispersant contained in the color ink may be 0.1 to 2 mass %, 0.1 to 1 mass %, or 0.1 to 0.5 mass % based on the total amount of the color ink.

1.2.4.2. Polymerization Inhibitor

The color ink may further contain a polymerization inhibitor. As the polymerization inhibitor, a single polymerization inhibitor may be used, or a combination of two or more polymerization inhibitors may be used. Examples of the polymerization inhibitor include those exemplified for the clear ink.

The content of the polymerization inhibitor contained in the color ink may be 0.05 to 1 mass % or 0.05 to 0.5 mass % based on the total amount of the color ink.

1.2.4.3. Slipping Agent

The color ink may further contain a slipping agent. As the slipping agent, a single slipping agent may be used, or a combination of two or more slipping agents may be used. Examples of the slipping agent include those exemplified for the clear ink.

The content of the slipping agent contained in the color ink may be 0.01 to 2 mass % or 0.05 to 1 mass % based on the total amount of the color ink.

1.3. Method for Manufacturing Clear Ink and Color Ink

The clear ink and the color ink are each manufactured (prepared) by mixing and stirring the components to be contained in the ink into a sufficiently uniform state. In the present embodiment, the preparation of the clear ink and the color ink may include a step of subjecting a mixture obtained by mixing a polymerization initiator and at least a part of monomers to ultrasonication and/or warming treatment in the preparation process. Consequently, the amount of dissolved oxygen in the prepared ink can be decreased, and the clear ink and the color ink can have excellent discharge stability and storage stability. The mixture may further contain other components that are contained in the clear ink or the color ink, as long as the above-mentioned components are contained, or may contain all components that are contained in the clear ink or the color ink. The monomers contained in the mixture may be at least a part of the monomers to be contained in the clear ink or the color ink.

2. Ink Jet Method

The ink jet method according to the present embodiment is an ink jet method using the above-described ink set and includes a step (first discharging step) of discharging a color ink with a liquid jet head to adhere the color ink to a recording medium, a step (first irradiation step) of irradiating the color ink adhered to the recording medium with radioactive rays, a step (second discharging step) of discharging a clear ink with a liquid jet head to adhere the clear ink to at least a part of the color ink-adhered region of the recording medium, and a step (second irradiation step) of irradiating the clear ink adhered to the recording medium with radioactive rays.

In the ink jet method according to the present embodiment, an image having excellent glossiness can be obtained by using the clear ink and the color ink described above. In addition, in the ink jet method according to the present embodiment, an image having excellent flexibility and scratch resistance can be obtained by using the clear ink and the color ink. Each of the steps will now be described in detail.

2.1. First Discharging Step

In the first discharging step, a color ink is discharged from a liquid jet head to adhere the ink to a recording medium. More specifically, a pressure-generating measure is driven to discharge the color ink filling a pressure-generating chamber of the liquid jet head from a nozzle. This discharge method is also referred to as an ink jet method.

As the liquid jet head 10 that is used in the first discharging step, for example, a line head that performs recording by a line system or a serial head that performs recording by a serial system can be used.

In the line system using a line head, for example, a liquid jet head having a width not narrower than the recording width of a recording medium is fixed to an ink jet apparatus. A recording medium is moved along the sub-scanning direction (the vertical direction or the transportation direction of the recording medium), and an ink droplet is discharged from a nozzle of the liquid jet head in conjunction with this movement to record an image on the recording medium.

In the serial system using a serial head, for example, a liquid jet head is mounted on a carriage that is movable in the width direction of a recording medium. The carriage is moved along the main scanning direction (the horizontal direction or the width direction of the recording medium), and an ink droplet is discharged from a nozzle opening of the head in conjunction with this movement to record an image on the recording medium.

2.2. First Irradiation Step

In the first irradiation step, the color ink adhered to the recording medium is irradiated with radioactive rays. Polymerization of monomers is initiated by irradiation with radioactive rays to cure the color ink, resulting in formation of a coating film. On this occasion, if a polymerization initiator is present, active species (initiating species), such as radicals, acids, and bases, are generated, and the polymerization of monomers is promoted by the function of the initiating species. In addition, if a photosensitizer is present, the photosensitizer absorbs radioactive rays and is transferred to an excited state and promotes the decomposition of the polymerization initiator by contact with the polymerization initiator. Consequently, the curing reaction can be further achieved.

Here, examples of the radioactive rays include ultraviolet rays, infrared rays, visible rays, and x-rays. The radiation source is disposed downstream the liquid jet head and irradiates the ink. The radiation source is not particularly limited, and examples thereof include an ultraviolet light-emitting diode. The use of such a radiation source can achieve downsizing of the apparatus and a reduction in cost. The ultraviolet light-emitting diode as an ultraviolet ray source is small sized and therefore can be attached to the inside of the ink jet apparatus.

For example, the ultraviolet light-emitting diode can be attached to a carriage (both ends along the medium width direction and/or the medium transporting direction side) on which a liquid jet head that discharges the radiation-curable ink jet composition is mounted. Furthermore, curing with low energy at a high speed can be achieved due to the above-described composition of the radiation-curable ink jet composition. The irradiation energy is calculated by multiplying the irradiation time by the irradiation intensity. Accordingly, the irradiation time can be shortened, and the printing speed is increased. In contrast, the irradiation intensity can also be decreased. Consequently, the coating film is gradually cured, and a cured coating film having excellent color development can be obtained.

2.3. Second Discharging Step

In the second discharging step, the clear ink is discharged from a liquid jet head such that the clear ink adheres to at least a part of the color ink-adhered region of the recording medium. The discharge method and the head to be used can be similar to those in the first discharging step.

2.4. Leveling Step

The recording method of the present embodiment may include, between the second discharging step and the second irradiation step, a leveling step of leaving the recording medium to which the clear ink adhered to stand for a predetermined time. When such a step is performed, since the clear ink is leveled on the color ink layer, the glossiness of the resulting recorded matter tends to be further improved. Incidentally, the term "leaving to stand" means that the recording medium to which the clear ink adhered by the second discharging step is not irradiated with radioactive rays of the second irradiation step, and during the leveling step, for example, the recording medium may be transported.

The time of leaving to stand in the leveling step may be 1 to 120 seconds, 2 to 100 seconds, or 4 to 80 seconds. When the time for leaving to stand is within the above-mentioned range, since the clear ink is sufficiently leveled on the color ink layer, the glossiness of the resulting recorded matter tends to be further improved.

2.5. Second Irradiation Step

In the second irradiation step, the clear ink adhered to the recording medium is irradiated with radioactive rays. In the ink jet method of the present embodiment, a reduction in the gloss of coating film of the clear ink is suppressed by using the ink set.

3. Ink Jet Apparatus

The ink jet apparatus of the present embodiment includes the above-described ink set, a liquid jet head, and a radiation source for irradiating the radiation-curable ink jet composition with radioactive rays.

As an example of the ink jet apparatus, FIG. 1 shows a perspective view a serial printer. As shown in FIG. 1, the serial printer 20 includes a transportation unit 220 and a recording unit 230. The transportation unit 220 transports a recording medium F fed to the serial printer to the recording unit 230 and, after recording, ejects the recording medium to the outside of the serial printer. Specifically, the transportation unit 220 includes feed rollers and transports the fed recording medium F in the sub-scanning direction T1.

In addition, the recording unit 230 includes an ink jet head 231 that discharges a radiation-curable ink jet composition toward a recording medium F fed from the transportation unit 220, a radiation source 232 that irradiates the adhered radiation-curable ink jet composition with radioactive rays, a carriage 234 on which the ink jet head 231 and the radiation source 232 are mounted, and a carriage moving mechanism 235 for moving the carriage 234 in the main scanning direction S1, S2 of the recording medium F.

The serial printer includes a head having a length shorter than the width of a recording medium as the ink jet head 231, and the head moves to perform recording by a plurality of passes (multi-pass). In addition, in the serial printer, the head 231 and a radiation source 232 are mounted on a carriage 234 that moves in a predetermined direction, and the head moves with movement of the carriage and discharges the radiation-curable ink jet composition onto a recording medium. Consequently, recording is performed by two or more passes (multi-pass). Incidentally, the pass is also called main scanning. Sub-scanning for transporting a recording medium is performed between passes. That is, main scanning and sub-scanning are alternately performed. Furthermore, when a leveling step is performed, the radiation source 232 is not driven during the pass for discharging an ink jet composition from the head 231, after the pass for discharging the ink jet composition, a pass for driving the radiation source 232 is performed without driving the head 231, and then sub-scanning may be performed. In addition, the radiation source 232 is disposed at a position displaced with respect to the head 231 in the sub-scanning direction, sub-scanning is performed after a pass for applying the clear ink from the head 231, and a pass for irradiating the clear ink-adhered region with radioactive rays by the radiation source 232 may be performed. Consequently, the ink jet composition is sufficiently leveled, and then the coating film can be cured by the radiation source 232. Accordingly, the glossiness of the coating film is improved.

Incidentally, FIG. 1 shows an aspect in which the radiation source is mounted on a carriage. However, the printer is not limited to this and may include a radiation source not mounted on a carriage.

In addition, the ink jet apparatus of the present embodiment is not limited to the printer of a serial system and may be a printer of the above-described line system.

4. Recorded Matter

The recorded matter of the present embodiment is made of the radiation-curable ink jet compositions adhered on a recording medium and cured thereon. When an ink set of the radiation-curable ink jet compositions is used, the image recorded by the color ink is protected by the clear ink and can have good glossiness. In addition, since the radiation-curable ink jet compositions have good flexibility and adhesion, cracking and chipping of the coating film can be prevented during post processing such as cutting and bending. Accordingly, the recorded matter of this embodiment can be suitably used in, for example, sign application.

The material of the recording medium is not particularly limited, and examples thereof include plastics, such as polyvinyl chloride, polyethylene terephthalate, polypropylene, polyethylene, polycarbonate, cellulose diacetate, cellulose triacetate, cellulose propionate, cellulose butyrate, cellulose acetate butyrate, cellulose nitrate, polystyrene, and polyvinyl acetal, and these plastics whose surfaces are processed; glass; paper; metals; and wood.

In addition, the recording medium may have any shape. Examples of the shape include a film, a board, and cloth.

EXAMPLES

The present disclosure will now be more specifically described by examples but is not limited to the following examples.

1. Preparation of Clear Ink and Color Ink

Polymerizable compounds, a polymerization initiator, a polymerization inhibitor, and a slipping agent were weighed according to each of the compositions of clear inks 1 to 9 shown in Table 1 and put in a stainless steel mixing tank. Subsequently, each mixture was mixed and stirred at ordinary temperature for 1 hour and was further filtrated through a membrane filter with a pore size of 5 μm to obtain clear inks 1 to 9. In addition, a color material, a dispersant, and a part of each monomer were weighed according to each of the compositions of color inks 1 and 2 shown in Table 1 and put in a pigment dispersing tank, and ceramic beads with a diameter of 1 mm were put in the tank, followed by stirring with a bead mill to prepare each pigment dispersion in which the color material was dispersed in the monomers. Subsequently, the remaining monomers, a polymerization initiator, and a polymerization inhibitor were put in a stainless steel mixing tank to give the composition shown in Table 1 and were mixed and stirred until they were completely dissolved, and the corresponding pigment dispersion prepared above was then added thereto, followed by further mixing and stirring at ordinary temperature for 1 hour and further filtrated through a membrane filter with a pore size of 5 μm to obtain color inks 1 and 2. Incidentally, the value of each component in each example shown in the table represents mass % unless otherwise specified.

TABLE 1

| | | | Tg | Volume (Å³) | Length (Å) | Volume/Length (Å²) | Clear ink 1 | 2 | 3 | 4 | 5 | 6 | 7 | 8 |
|---|---|---|---|---|---|---|---|---|---|---|---|---|---|---|
| Polymerizable compound component | Monofunctional monomer | TMCHA | 30 | 293 | 8.02 | 36.53 | 0 | 0 | 0 | 10 | 0 | 0 | 0 | 0 |
| | | DCPA | 110 | 260 | 9.01 | 28.88 | 52.3 | 40.3 | 0 | 20 | 0 | 49.3 | 26.8 | 44 |
| | | IBXA | 94 | 278 | 8.01 | 34.74 | 24 | 24 | 40 | 38.3 | 36.3 | 24 | 31.5 | 24 |
| | | TBCHA | 10 | 290 | 10.19 | 28.49 | 0 | 0 | 34 | 0 | 33 | 0 | 0 | 0 |
| | | LA | −23 | 354 | 13.79 | 25.66 | 0 | 0 | 0 | 0 | 4 | 0 | 0 | 0 |
| | | INAA | −58 | 287 | 10.50 | 27.31 | 0 | 0 | 0 | 10 | 0 | 0 | 0 | 0 |
| | | PEA | −22 | 244 | 11.01 | 22.15 | 5 | 5 | 10 | 5 | 10 | 5 | 5 | 8.3 |
| | | ACMO | 145 | 179 | 5.89 | 30.41 | 7 | 10 | 0 | 5 | 0 | 10 | 10 | 10 |
| | Multifunctional monomer | VEEA | 39 | 241 | 7.38 | 32.67 | 0 | 0 | 3 | 0 | 5 | 2 | 0 | 5 |
| | | DPGDA | 104 | 313 | 8.16 | 38.34 | 3 | 12 | 4.3 | 3 | 3 | 1 | 18 | 0 |
| | | HDDA | 43 | 299 | 12.54 | 23.83 | 0 | 0 | 0 | 0 | 0 | 0 | 0 | 0 |
| Polymerization initiator | | Irg. 819 | | | | | 2.5 | 2.5 | 2.5 | 2.5 | 2.5 | 2.5 | 2.5 | 2.5 |
| | | TPO | | | | | 5.5 | 5.5 | 5.5 | 5.5 | 5.5 | 5.5 | 5.5 | 5.5 |
| Polymerization inhibitor | | MEHQ | | | | | 0.2 | 0.2 | 0.2 | 0.2 | 0.2 | 0.2 | 0.2 | 0.2 |
| Slipping agent | | BYK UV3500 | | | | | 0.5 | 0.5 | 0.5 | 0.5 | 0.5 | 0.5 | 0.5 | 0.5 |
| Color material | | PB15:3 | | | | | — | — | — | — | — | — | — | — |
| Dispersant | | solsperse36000 | | | | | — | — | — | — | — | — | — | — |
| Total | | | | | | | 100 | 100 | 100 | 100 | 100 | 100 | 100 | 100 |
| Proportion (mass %) of monofunctional monomer | | | | | | | 97 | 87 | 92 | 97 | 91 | 97 | 80 | 95 |
| Proportion (mass %) of monomer A | | | | | | | 87 | 84 | 86 | 89 | 84 | 81 | 84 | 74 |
| Weighted average temperature (° C.) of glass transition temperatures | | | | | | | 101 | 102 | 49 | 71 | 43 | 101 | 100 | 94 |
| Proportion (mass %) of monomer A based on total amount of monofunctional monomers | | | | | | | 86 | 81 | 88 | 89 | 88 | 83 | 80 | 79 |

| | | | | Clear ink 9 | Color ink 1 | Color ink 2 |
|---|---|---|---|---|---|---|
| Polymerizable compound component | Monofunctional monomer | TMCHA | | 0 | 0 | 0 |
| | | DCPA | | 44 | 47.1 | 32.1 |
| | | IBXA | | 24 | 24 | 24 |
| | | TBCHA | | 0 | 0 | 0 |
| | | LA | | 0 | 0 | 0 |
| | | INAA | | 0 | 0 | 0 |
| | | PEA | | 8.3 | 5 | 5 |
| | | ACMO | | 10 | 10 | 10 |
| | Multifunctional monomer | VEEA | | 0 | 0 | 3 |
| | | DPGDA | | 3 | 3 | 15 |
| | | HDDA | | 2 | 0 | 0 |
| Polymerization initiator | | Irg. 819 | | 2.5 | 2.5 | 2.5 |
| | | TPO | | 5.5 | 5.5 | 5.5 |
| Polymerization inhibitor | | MEHQ | | 0.2 | 0.2 | 0.2 |
| Slipping agent | | BYK UV3500 | | 0.5 | 0.5 | 0.5 |
| Color material | | PB15:3 | | — | 2 | 2 |
| Dispersant | | solsperse36000 | | — | 0.2 | 0.2 |
| Total | | | | 100 | 100 | 100 |
| Proportion (mass %) of monofunctional monomer | | | | 95 | 97 | 80 |
| Proportion (mass %) of monomer A | | | | 78 | 83 | 80 |
| Weighted average temperature (° C.) of glass transition temperatures | | | | 96 | 102 | 99 |
| Proportion (mass %) of monomer A based on total amount of monofunctional monomers | | | | 79 | 83 | 79 |

The abbreviations and product components used in Table 1 are as follows.

Monofunctional Monomer

TMCHA (trade name: "Viscoat #196", manufactured by Osaka Organic Chemical Industry Ltd., 3,3,5-trimethylcyclohexyl acrylate)

DCPA (manufactured by Hitachi Chemical Co., Ltd., dicyclopentenyl acrylate)

IBXA (manufactured by Osaka Organic Chemical Industry Ltd., isobornyl acrylate)

TBCHA (trade name: "SR217", manufactured by Sartomer, tert-butylcyclohexanol acrylate)

LA (trade name: "Light Acrylate L-A", manufactured by Kyoeisha Chemical Co., Ltd., lauryl acrylate)

INAA (manufactured by Osaka Organic Chemical Industry Ltd., isononyl acrylate)

PEA (trade name: "Viscoat #192", manufactured by Osaka Organic Chemical Industry Ltd., phenoxyethyl acrylate)

ACMO (manufactured by KJ Chemicals Corporation, acryloylmorpholine)

Multifunctional Monomer

VEEA (manufactured by Nippon Shokubai Co., Ltd., 2-(2-vinyloxyethoxy) ethyl acrylate)

DPGDA (trade name: "SR508", manufactured by Sartomer, dipropylene glycol diacrylate)

HDDA (trade name: "Viscoat #230", manufactured by Osaka Organic Chemical Industry Ltd., 1,6-hexanediol di(meth)acrylate)

Polymerization Initiator

Irg. 819 (trade name: "IRGACURE 819", manufactured by BASF SE, bis(2,4,6-trimethylbenzoyl)-phenylphosphine oxide)

TPO (trade name: "IRGACURE TPO", manufactured by BASF SE, 2,4,6-trimethylbenzoyl diphenylphosphine oxide) Polymerization inhibitor MEHQ (trade name: "p-Methoxyphenol", manufactured by Kanto Chemical Co., Inc., hydroquinone monomethyl ether) Slipping agent BYK-UV3500 (manufactured by BYK Additives & Instruments, polyether-modified polydimethylsiloxane having an acryloyl group)
Color Material (Pigment)
    PB 15:3 (C.I. Pigment Blue 15:3) Dispersant
    Solsperse 36000 (manufactured by The Lubrizol Corporation, polymer dispersant)

In Table 1, the "Proportion of monofunctional monomer" in the physical property column represents the content of monofunctional monomers based on the total amount of the polymerizable compound component. The polymerizable compound component specifically refers to the monofunctional monomers and the multifunctional monomers in Table 1.

In Table 1, the "Proportion of monomer A" in the physical property column represents the content of monomer A based on the total amount of the polymerizable compound component. The polymerizable compound component specifically refers to the monofunctional monomers and the multifunctional monomers in Table 1.

In Table 1, the "Weighted average temperature of glass transition temperatures" in the physical property column represents the weighted average of the glass transition temperatures of homopolymers of the respective polymerizable compounds when the mass ratios of the contents of the respective polymerizable compounds are weighted.

In Table 1, the "Proportion of monomer A based on total amount of monofunctional monomers" in the physical property column represents the content of monomer A based on the total amount of the monofunctional monomers.

2. Ink Set

The clear inks and the color inks prepared as described above were combined as ink sets and were evaluated as follows.

In Table 1, the "Volume" represents the volume of a cavity estimated from the van-der-Waals radius of a molecule in a state of floating in a vacuum calculated using software "COSMOtherm" (manufactured by MOLSIS Inc.).

The "Length" in Table 1 represents the longest side length in the calculation of the "Volume" using software "COSMOtherm" (manufactured by MOLSIS Inc.).

The "Volume/Length" in Table 1 represents the value obtained by dividing the "Volume" by the "Length". This value means the area in the height direction with respect to the long side.

2. Evaluation Method
2.3. Evaluation of Flexibility

A color ink was applied onto a vinyl chloride film (JT5829R, manufactured by MACtac LLC) with a bar coater at a thickness of 10 μm and was cured using a metal halide lamp (manufactured by Eye Graphics Co., Ltd.) at an energy of 400 mJ/cm$^2$ to form a coating film. Furthermore, a clear ink was applied onto the coating film of the color ink at a thickness of 10 μm, followed by curing using a metal halide lamp (manufactured by Eye Graphics Co., Ltd.) at an energy of 400 mJ/cm$^2$ to form a coating film.

The vinyl chloride film as release paper on which the coating film was formed was peeled off, and the coating film was cut into a strip shape having a width of 1 cm and a length of 8 cm to produce a test piece. The elongation percentage of each test piece was measured as an indicator of the flexibility using a tension tester (TENSILON, manufactured by ORIENTEC Corporation). The test piece was pulled at 5 mm/min, and the elongation value at the time when a crack was generated was defined as the elongation percentage. The value was calculated by {[(length at cracking)−(length before elongation)]/(length before elongation)}×100. The evaluation criteria are shown below.
Evaluation Criteria
    A: 300% or more,
    B: 200% or more and less than 300%, and
    C: less than 200%.
2.5. Evaluation of Scratch Resistance The coating films produced and cured in the evaluation of flexibility were evaluated by a micro-scratch test according to JIS R3255. In the measurement, as the scratch resistance, the withstand load was measured using a nano-layer scratch tester (CSR-5000, manufactured by Nanotec Corporation). Micro-scratching was performed while applying a load, and the load when a probe reached the surface of a medium was defined as the withstand load. A higher withstand load means higher scratch resistance. In the measurement, the probe stylus diameter was 15 μm, the amplitude was 100 μm, and the scratching rate was 10 μm/sec. The evaluation criteria are as follows.
Evaluation Criteria
    A: 25 mN/cm$^2$ or more,
    B: 20 mN/cm$^2$ or more and less than 25 mN/cm$^2$, and
    C: less than 20 mN/cm$^2$.
2.6. Glossiness A color ink was applied onto a polycarbonate film (Lupilon NF2000, manufactured by Mitsubishi Gas Chemical Co., Ltd.) with a bar coater at a thickness of 10 μm and was then cured using a UV-LED at an energy of 400 mJ/cm$^2$ to form a coating film. Furthermore, a clear ink was applied onto the coating film of the color ink at a thickness of 10 μm, followed by leaving to stand for 1 minute and was then cured using a UV-LED at an energy of 400 mJ/cm$^2$ to form a

TABLE 2

|  |  | Example |  |  |  |  |  |  |  |  | Comparative Example |  |  |  |
|---|---|---|---|---|---|---|---|---|---|---|---|---|---|---|
|  |  | 1 | 2 | 3 | 4 | 5 | 6 | 7 | 8 | 9 | 1 | 2 | 3 | 4 |
| Clear ink |  | 1 | 2 | 3 | 4 | 5 | 6 | 7 | 2 | 7 | 8 | 9 | 8 | 9 |
| Color ink |  | 1 | 1 | 1 | 1 | 1 | 1 | 1 | 2 | 2 | 1 | 1 | 2 | 2 |
| Evaluation of coating film of clear ink | Flexibility | A | B | B | A | B | A | C | B | C | A | A | A | A |
|  | Scratch resistance | A | A | B | B | C | A | B | A | B | B | A | B | A |
|  | Glossiness | A | B | A | A | A | B | B | B | A | D | D | C | C | coating film. The resulting coating film was visually observed from a certain distance to verify the reflection of fluorescent light by the coating film. The evaluation criteria are as follows.

Evaluation Criteria

A: reflection of fluorescent light can be observed from a distance of 50 cm or more, B: reflection of fluorescent light can be observed from a distance of 30 cm or more and less than 50 cm, C: reflection of fluorescent light can be observed from a distance of 10 cm or more and less than 30 cm, and D: reflection of fluorescent light can be observed from a distance of less than 10 cm or cannot be observed.

3. Results of Evaluation

Tables 1 and 2 show the composition of the ink set used in each Example and the results of evaluation. It was demonstrated from Table 1 that when any of the ink sets of Examples 1 to 9, each including a certain amount of monomer A, is used, images having excellent glossiness can be obtained. For details, it is demonstrated by comparison of each Example with Comparative Examples 1 to 4 that when an ink set whose content of monomer A is 80 mass % or more is used, glossiness is improved. Furthermore, separately, a clear ink and a color ink shown in Table 1 were recorded on a polycarbonate film using an ink jet printer as shown in FIG. 1, it was observed as a result that good recording was performed.

What is claimed is:

1. An ink set of radiation-curable ink jet compositions each comprising a polymerizable compound component, wherein
the ink set includes a color ink and a clear ink as the radiation-curable ink jet compositions;
the polymerizable compound component contained in the clear ink includes a monomer A having a volume of 260 angstrom$^3$ or more and an area of 25 angstrom$^2$ or more in the height direction with respect to a long side defined by a van-der-Waals radius, and a content of the monomer A contained in the clear ink is 80 mass % or more based on the total amount of the polymerizable compound component.

2. The ink set according to claim 1, wherein
the polymerizable compound component contained in the clear ink includes a monofunctional monomer component; and
a content of the monofunctional monomer component contained in the clear ink is 85 mass % or more based on the total amount of the polymerizable compound component contained in the clear ink.

3. The ink set according to claim 1, wherein
the polymerizable compound component contained in the clear ink includes a monofunctional monomer component; and
when the monomer A included in the monofunctional monomer component is referred to as monomer A1, a content of the monomer A1 in the clear ink is 85 mass % or more based on the total amount of the monofunctional monomer component.

4. The ink set according to claim 1, wherein
the polymerizable compound component contained in the clear ink includes a multifunctional monomer component; and
a content of multifunctional monomer component contained in the clear ink is 0.01 to 15 mass % based on the total amount of the polymerizable compound component contained in the clear ink.

5. The ink set according to claim 1, wherein
when mass ratios of contents of the respective polymerizable compounds contained in the clear ink are weighted, a weighted average of glass transition temperatures of homopolymers of the respective polymerizable compounds is 48° C. or more.

6. The ink set according to claim 1, wherein
the polymerizable compound component contained in the clear ink includes an alicyclic group-containing (meth)acrylate as a monofunctional monomer.

7. The ink set according to claim 1, wherein
the polymerizable compound component contained in the color ink includes a monofunctional monomer component; and
a content of the monofunctional monomer component contained in the color ink is 85 mass % or more based on the total amount of the polymerizable compound component contained in the color ink.

8. An ink jet method using the ink set according to claim 1, the method comprising:
a first discharging step of discharging the color ink with a liquid jet head to adhere the color ink to a recording medium;
a first curing step of irradiating the color ink adhered to the recording medium with radioactive rays;
a second discharging step of discharging the clear ink with a liquid jet head to adhere the clear ink to at least a part of the color ink-adhered region of the recording medium; and
a second curing step of irradiating the clear ink adhered to the recording medium with radioactive rays.

9. The ink jet method according to claim 8, the method further comprising:
a leveling step of leaving the recording medium to which the clear ink adhered to stand after the second discharging step and before the second curing step.

10. The ink set of radiation-curable ink jet compositions according to claim 1, wherein the monomer A includes at least one selected from the group consisting of dicyclopentenyl acrylate, 3,3,5-trimethylcyclohexyl acrylate, tertbutylcyclohexanol acrylate, and isononyl acrylate.

11. The ink set of radiation-curable ink jet compositions according to claim 1, wherein the clear ink includes a plurality of monomers A, and that when mass ratios of contents of each of the monomers A contained in the clear ink are weighted, a weighted average of glass transition temperatures of homopolymers of the respective monomers A is 48° C. or more.

* * * * *